US010757038B2

(12) United States Patent
McDonald et al.

(10) Patent No.: US 10,757,038 B2
(45) Date of Patent: Aug. 25, 2020

(54) RESERVATION-BASED SWITCHING DEVICES

(71) Applicant: HEWLETT PACKARD ENTERPRISE DEVELOPMENT LP, Houston, TX (US)

(72) Inventors: Nicholas George McDonald, Fort Collins, CO (US); Darel Neal Emmot, Wellington, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/029,442

(22) Filed: Jul. 6, 2018

(65) Prior Publication Data

US 2020/0014635 A1 Jan. 9, 2020

(51) Int. Cl.
*H04L 12/933* (2013.01)
*H04L 12/911* (2013.01)
*H04L 5/00* (2006.01)

(52) U.S. Cl.
CPC ............ *H04L 49/15* (2013.01); *H04L 5/0055* (2013.01); *H04L 47/72* (2013.01)

(58) Field of Classification Search
CPC .................................................. H04L 12/5601
See application file for complete search history.

(56) References Cited

U.S. PATENT DOCUMENTS

| 5,214,640 | A | 5/1993 | Sakurai et al. |
| 6,324,613 | B1 | 11/2001 | Aguilar et al. |
| 8,352,669 | B2 * | 1/2013 | Wu ...................... H04Q 3/0004 710/317 |
| 9,100,323 | B1 | 8/2015 | Sindhu et al. |
| 9,693,124 | B2 | 6/2017 | Robinson et al. |
| 9,699,078 | B1 | 7/2017 | Chen et al. |
| 2006/0126610 | A1 | 6/2006 | Ryan et al. |

(Continued)

FOREIGN PATENT DOCUMENTS

| EP | 0206512 A2 | 12/1986 |
| EP | 0849917 B1 | 7/2005 |
| JP | 2817770 B2 | 10/1998 |

OTHER PUBLICATIONS

Koka, P. et al., "Silicon-Photonic Network Architectures for Scalable, Power-Efficient Multi-Chip Systems," (Research Paper), Jun. 19-23, 2010, pp. 117-128, http://dl.acm.org/citation.cfm?id=1815977.

(Continued)

*Primary Examiner* — Kouroush Mohebbi
(74) *Attorney, Agent, or Firm* — Park, Vaughan, Fleming & Dowler LLP

(57) ABSTRACT

Examples relate to switching devices comprising a switch controller and a plurality of interconnected sub-switches forming an internal network of the switching device. A packet is received at a first sub-switch of the plurality of interconnected sub-switches. The packet is to be routed to a particular external output port of a second sub-switch of the plurality of interconnected sub-switches. Upon reception of the packet, the switch controller reserves a space for the packet in a queue associated to the particular external output port. Then, the switch controller routes the packet on the internal network to the particular external output to occupy the reserved space for the packet.

18 Claims, 6 Drawing Sheets

(56) References Cited

U.S. PATENT DOCUMENTS

| | | |
|---|---|---|
| 2006/0285548 A1 | 12/2006 | Hill et al. |
| 2007/0145828 A1 | 6/2007 | Taylor et al. |
| 2008/0279195 A1 | 11/2008 | Okuno |
| 2011/0167158 A1 | 7/2011 | Lehr et al. |
| 2011/0310739 A1 | 12/2011 | Aybay |
| 2012/0134359 A1 | 5/2012 | Nakagawa |
| 2012/0140626 A1 | 6/2012 | Anand et al. |
| 2017/0214579 A1 | 7/2017 | Chen et al. |

OTHER PUBLICATIONS

International Search Report and Written Opinion received for PCT Patent Application No. PCT/US2019/028122, dated Aug. 7, 2019, 11 pages.

International Search Report and Written Opinion received for PCT Application No. PCT/US2019/059160, dated Mar. 27, 2020, 09 pages.

\* cited by examiner

RESERVATION-BASED SWITCHING DEVICES

BACKGROUND

Network switching devices can be implemented as interconnected sub-networks that connect the external input and output ports of these network switching devices. These network switching devices, such as routers or switches, may exhibit external port-to-port dependencies that may generate deadlocks. External port-to-port dependencies may determine the success of a packet received via a particular external input port and desiring to exit the network switching device on a particular external output port that is not permanently dependent on the success of another packet received via a different external input port and exiting through a different external output port of the same network switching device. In particular, high-radix switching devices may be difficult to implement since on-chip requirements may grow with a polynomial factor. A network switching device may be implemented as a hierarchical switching device to reduce the size needed for implementation but these inner hierarchical topologies may present external port-to-port dependencies. Although hierarchical switching devices can be overprovisioned to remove all port-to-port dependencies, this overprovisioning may waste bandwidth within the switching device. Alternatively, hierarchical switching devices may allow port-to-port dependencies and implement a routing algorithm that provides enough virtual channels to remain deadlock free, but this may waste resources too.

DETAILED DESCRIPTION

Figure 1:
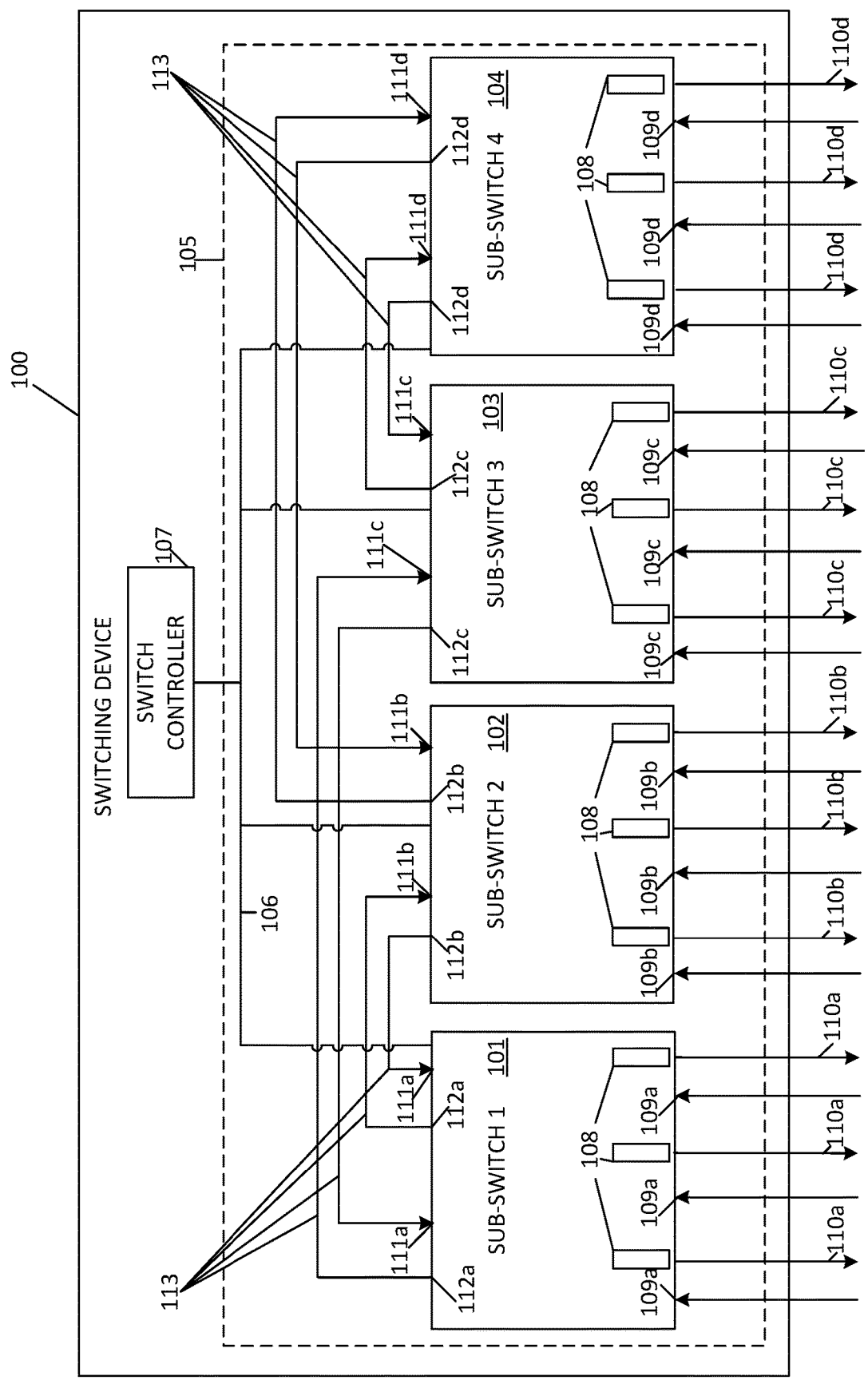
FIG. 1 is a block diagram of an example reservation-based switching device with a plurality of interconnected sub-switches forming a 2-dimensional mesh network.

Examples disclosed herein describe reservation-based switching devices that may comprise a switch controller and a plurality of interconnected sub-switches forming the internal sub-network of the reservation-based switching device. A first sub-switch (sender sub-switch) of the internal sub-network of the switching device may receive a packet that is to be routed to a particular external output port of a second sub-switch (receiver sub-switch) of the same internal sub-network. The switch controller, upon receipt of the packet at the first sub-switch, may reserve a space for the packet in a queue associated to the particular external output port and route the packet on the internal sub-network to the particular external output to occupy the reserved space in the queue. The queues associated to the external output ports may be any kind of queue such as circular queues, priority queues, etc. The external output ports are ports for forwarding packets to devices external to the reservation-based switching device, for example to a destination device to which the packets are to be routed in an external network.

As generally described herein, a switch controller may represent a combination of hardware and software logic in a switching device for routing packets through the internal sub-network of the switching device from the external input ports that receive the packets to the destination external output ports to which the packets are to be routed. In some examples, one single switch controller may implement the hardware and software logic for routing packets through the internal sub-network while in some other examples, each sub-switch forming the internal sub-network may comprise a switch controller implementing the hardware and software logic that to perform the functionalities for routing packets.

The reservation-based switching devices, hereinafter referred to as switching devices, can be considered as hierarchical switching devices since the inner structure of the switching devices comprises a plurality of interconnected sub-switches. This hierarchical inner topology can break all port-to-port dependencies internally such that the composite design can be considered as a monolithic switching device. Therefore, this inner hierarchical switch architecture may provide internal deadlock avoidance independent of the deadlock avoidance scheme used in the external network.

The interconnected sub-switches of the switching device may comprise internal input ports and internal output ports to exchange packets with other interconnected sub-switches within the internal sub-network. In addition to the external output ports, the interconnected sub-switches may comprise external input ports to receive packets from devices external to the switching devices, for example other routing devices to which the switching device may be connected in a network.

As used herein, a switching device may refer to devices that determine the route or direction a data packet is to take in a network. Examples of switching devices may be routers or switches. As used herein, a sub-switch may refer to switching devices that participate with other switching devices within a logical composite arrangement such that the plurality of sub-switches behave as a single switching device. The sub-switches may determine the route or direction a data packet is to take through the internal sub-network of the switching device.

By performing reservations in the external output ports prior to routing packets through their internal sub-networks, the switching devices, as herein disclosed, disaggregate their internal sub-network from their external network. In this way, the internal sub-network and the external network, network to which the switching device is externally interconnected, of the switching device avoid deadlocks independently.

In some examples, the switch controller may determine the particular external output port to which the packet is to be routed. For example, the switch controller may inspect the packet, e.g. the packet's header, to determine the destination for the packet within the external network to which the switching device is interconnected. Based on the destination device to which the packet is to be routed, the switch controller may check a routing table that may be indexed by the information in the packet, e.g., its destination address, to determine the external output port of the switching device the packet is to take towards its destination. In other examples, the switch controller may determine the external output port algorithmically. Moreover, the switch controller may determine the route for the packet within the internal sub-network towards its destination external output port.

In some examples, the switch controller may send a reservation request to the second sub-switch. The reservation request may be for reserving an amount of space for the packet in the queue associated to the particular external output port. For example, the reservation request may specify an amount of space in the queue that corresponds to the size of the received packet. Depending on how the queue is designed, the reservation request may specify a specific amount of bytes, flits, packets, etc. For example, in a system that uses 16 byte flits, a 1024 byte packet received at one of the external input ports would cause the switch controller to reserve 64 (1024/16) flits worth of space in the respective queue of the destination external output port.

In some other examples in which the switch controller previously knows the size of the packets that may receive, the switch controller may send reservation requests to the second sub-switch specifying an amount of space to be reserved in the queue that may be enough to store at least one packet. In this way, the switch controller may reserve some space in the different queues associated to some or all the external output ports of the switching devices for the some or all the external input ports of the switching device. In this way, the queues may have dedicated space, due to the reservations received, for the external input ports. In such examples, the reservation requests may also specify a specific amount of bytes, flits, packets, etc.

In some examples, when the reservation request is received at the second sub-switch (receiver sub-switch), the switch controller may check whether there is enough space available in the queue for the reservation. When the switch controller determines that there is enough space available in the queue for the reservation, the switch controller may reserve, for example by temporary blocking the space in the queue until the packet is received, the requested amount of space for the packet. Then, the switch controller may send an acknowledgement (ACK) to the first sub-switch (sender sub-switch) informing that the requested space has been temporary blocking and is available to store the packet. Once the packet is routed to the second sub-switch, the packet is stored in the reserved space in the queue until the packet is processed and forwarded.

When the switch controller determines that there is not enough space available in the queue for the packet, the switch controller may hold the reservation request until there is enough space available in the queue for the packet. When some space is freed in the queue so that the requested space is available, the switch controller may reserve the requested space and send the corresponding ACK to the first sub-switch. In other examples, the switch controller may automatically reject the reservation request and send a negative-acknowledgement (NAK) to the first sub-switch. In such examples, in response to reception of the NAK, the switch controller may retransmit the reservation request to the second sub-switch until the reservation request is acknowledged. In some other examples, the switch controller may hold the reservation request for a predefined period of time. If enough space is freed in the queue before expiration of the predefined period of time, the switch controller may reserve the requested space and send the corresponding ACK to the first sub-switch. If after expiration of the predefined period of time not enough space in the queue has been freed for the packet, the switch controller may reject the reservation request and send a NAK to the first sub-switch. In such examples, in response to reception of the NAK, the switch controller may retransmit the reservation request to the second sub-switch until the reservation request is acknowledged.

In some other examples, the queue associated to the particular external output port may have a dedicated space, i.e., a quantity of space in the queue, for each one of the external input ports of the switching device such that the space reserved for the packet is within the dedicated space in the queue for the particular external input port through which the packet has been received. For example, each queue associated to a particular external output port of the plurality of external output ports of the switching device has a dedicated space, e.g., a pre-defined amount of space, assigned for each one of the plurality of external input ports of the switching device. These dedicated spaces are to only store packets from the external input ports to which the dedicated spaces are assigned.

In such examples, the first sub-switch, prior to reserving the space for the packet, may check whether there is enough space available for the packet in the corresponding dedicated space. When there is not enough space available in the dedicated space for the packet in the particular external input port, the first sub-switch may hold the packet in a queue associated to the particular external input port until there is enough space available in the particular dedicated space for the packet. The queues associated to the external input ports may be any kind of queue such as circular queues, priority queues, etc.

The switch controller may further send a notification to the first sub-switch when one of the packets previously routed by said first sub-switch leaves the dedicated space in the queue in which it was stored. These notifications may comprise information about the external output port to which is associated the queue from which the packet has left and an indication of the amount of space freed by the packet or the amount of space available in that dedicated space at that moment. The amount of space available in that dedicated space may correspond to portions of a packet or multiple packets. For example, these notifications may comprise credits representing bytes, flits, packets, etc., or specify absolute queue availability or occupancy.

In some examples, the internal sub-network may be a deadlock free network. In such examples, the switching device may implement additional resources, such as virtual or physical channels, etc., to remove internal network cyclic dependencies. Therefore, depending on the topology of the internal sub-network of the switching device, additional resources to manage deadlock uniquely may be implemented.

In the following description, for purposes of explanation, numerous specific details are set forth in order to provide a thorough understanding of the present devices and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 shows a block diagram of an example reservation-based switching device 100 with a plurality of interconnected sub-switches 101-104 forming a 2-dimensional (2D) mesh network as the internal sub-network of the reservation-based switching device 100. It should be understood that the example switching device 100 may include additional components and that some of the components described herein may be removed and/or modified without departing from a scope of the example switching device 100. Additionally, implementation of example switching device 100 is not limited to such example as shown in FIG. 1. While FIG. 1 shows a reservation-based switching device 100 comprising four interconnected sub-switches, the reservation-based switching device 100 may comprise any number of interconnected sub-switches.

The switching device 100 has twelve external input ports 109 to receive packets from other external devices to which the switching device 100 may be connected in an external network (not shown in this figure) and twelve external output ports 110 to send packets to these external devices. More particularly, sub-switch1 101 is connected to external input ports 109a and to external output ports 110a, sub-switch2 102 is connected to external input ports 109b and to external output ports 110b, sub-switch3 103 is connected to external input ports 109c and to external output ports 110c and sub-switch4 104 is connected to external input ports 109d and to external output ports 110d.

Moreover, sub-switch1 101 has two internal input ports 111a and two internal output ports 112a to receive and send packets from/to sub-switch2 102 and sub-switch3 103, respectively. In turn, sub-switch2 102 has two internal input ports 111b and two internal output ports 112b to receive and send packets from/to sub-switch1 101 and sub-switch4 104, respectively. Sub-switch3 103 has two internal input ports 111c and two internal output ports 112c to receive and send packets from/to sub-switch1 101 and sub-switch4 104, respectively, and sub-switch4 104 has two internal input ports 111d and two internal output ports 112d to receive and send packets from/to sub-switch2 102 and sub-switch3 103, respectively.

Sub-switches 101-104 are connected to each other by inter-sub-switch links 116. These inter-sub-switch links 116 may be electrical links, optical links or a combination of electrical and optical links. The four sub-switches 101-104 and their inter-sub-switch links 116 form the internal 2D mesh network 105 of the switching device 100.

While FIG. 1 shows all sub-switches 101-104 having three external input ports and three external output ports, the sub-switches may have any number of external input and output ports. In some examples, the sub-switches may have a different number of input ports and output ports or may have a different number of ports between them. In some other examples, some of the sub-switches may not have external output or input ports so these sub-switches may act as a forwarding sub-switch within the internal sub-network.

The switching device 100 has a switch controller 107 for routing packets through the 2D mesh sub-network 105. The external output ports 110 have associated a respective queue 108 to store data packets until they are processed and forwarded towards its destination. These queues 108 can be any kind of queues such as First-In-First-Out (FIFO) queues, circular queues, priority queues, etc. Although not shown in FIG. 1, the external input ports and the internal input and output ports may comprise respective queues, for example FIFO queues, circular queues, priority queues, etc., to store received packets until they are processed. The sub-switches 101-104 and the switch controller 107 are also interconnected by a bidirectional reservation bus 106 to exchange reservation requests, ACKs and NAKs.

The switching device 100 receives packets via any of its external input ports 109. The packet may comprise a header specifying its destination, e.g. a destination address, so that the switch controller 107 can determine the external output port 110 for the packet to be routed towards its destination. The external input port 109 through which the packet is received and the external output port 110 through which the packet is to be sent towards its destination may belong to different sub-switches 101-104. Then, the switch controller 107 reserves a space for the particular packet in the queue 108 associated to the particular external output port 110 to which the packet is to be routed. Simultaneously, the switch controller 107 determines an optimal route within the 2D mesh sub-network 105 for the packet. When the space for the packet in the queue 108 has been reserved, the switch controller 107 routes the packet from the sender sub-switch 101-104 (sub-switch having the external input port 109 through which the packet is received) to the receiver sub-switch 101-104 (sub-switch having the external output port 110 through which the packet is to be routed towards its destination) and stores the packet in the queue 108 associated to the corresponding external output port 110. Once the packet has been processed by the switch controller 107, it is forwarded to its destination freeing the reserved space up in the queue 108 that is now available for a new reservation.

In some examples, the switching device 100 may track how much space has been taken, both physically and reserved. For example, the switching device 100 may implement credit-based flow control algorithm to control the space in the queues 108. The queues 108 associated to each external output port 110 may have credit counters to track the already taken and the available space in the queues 108. Other control algorithms may be implemented in the switching devices, such as ACK/NAK protocols, etc., to manage the space in the queues 108.

In some examples the switching device 100 may be a multi-die switch where at least one sub-switch is located on a particular die. For example, each die may comprise one, two or a different number of sub-switches wherein sub-switches within a common die and sub-switches in different dies of a multi-die switch are all interconnected forming the internal network of the switching device.

While the example of FIG. 1 refers to a reservation-based switching device with a plurality of interconnected sub-switches forming a 2D mesh network as its internal sub-network, the reservation-based switching device may have a plurality of interconnected sub-switches forming a different internal sub-network topology.

Figure 2:
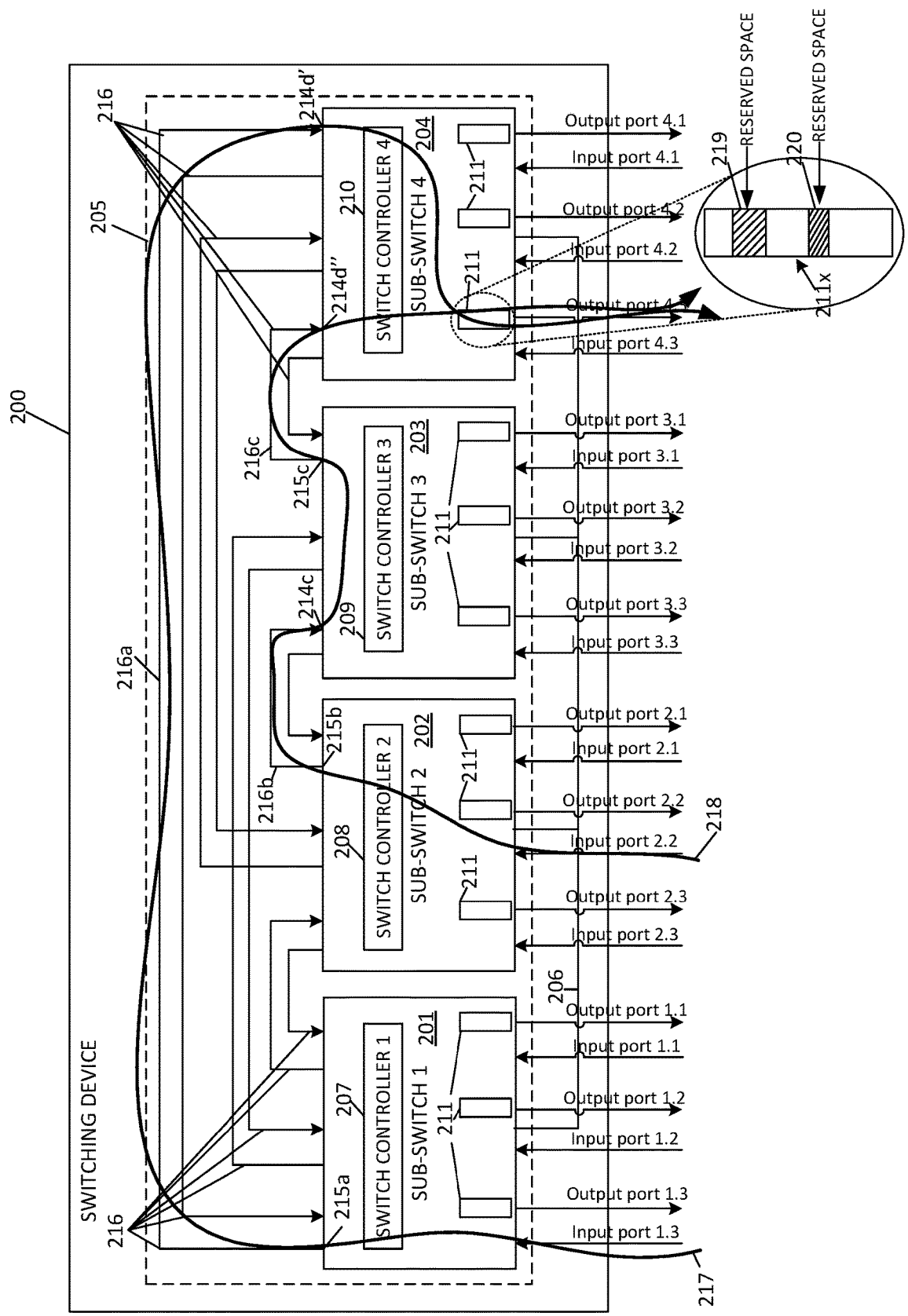
FIG. 2 is a block diagram of an example reservation-based switching device with a plurality of interconnected sub-switches forming a fully interconnected all-to-all network that uses reservation requests for routing packets.

FIG. 2 is a block diagram of an example reservation-based switching device 200 with a plurality of interconnected sub-switches 201-204 forming a fully interconnected all-to-all network 205 that uses reservation requests for routing packets. It should be understood that the example switching device 200 may include additional components and that some of the components described herein may be removed and/or modified without departing from a scope of the example switching device 200. Additionally, implementation of example switching device 200 is not limited to such example as shown in FIG. 2. While FIG. 2 shows a reservation-based switching device 200 comprising four interconnected sub-switches forming a fully interconnected allto-all network, the reservation-based switching device 200 may comprise any number of interconnected sub-switches forming any kind of network as the internal sub-network of the switching device 200.

The switching device 200 has twelve external input ports 1.1-3, 2.1-3, 3.1-3, 4.1-3 to receive packets from other external devices to which the switching device 200 may be connected in an external network and twelve external output ports 1.1-3, 2.1-3, 3.1-3, 4.1-3 to send packets to these external devices. In addition, each sub-switch 201-204 has three internal input ports and three internal output ports to receive and send packets from/to the rest of sub-switches 201-204 within the fully interconnected all-to-all network 205. The four sub-switches 201-204 and their inter-sub-switch links 216 form the internal fully interconnected all-to-all network 205 of the switching device 200. As used herein, a fully interconnected all-to-all network may be a network in which all nodes are connected to each other. For example, the fully interconnected all-to-all network may be a one-dimensional HyperX network or a one-dimensional flattened butterfly network.

In such example, each sub-switch 201-204 has a respective switch controller 207-210 for routing packets through its internal fully interconnected all-to-all network 205. The external output ports 1.1-3, 2.1-3, 3.1-3, 4.1-3 have associated a respective queue 211 to store packets until they are processed and forwarded towards its destination. These queues 211 can be any kind of queues such as circular queues, priority queues, etc. The rest of input and output ports of the switching device 200 can also have a queue (not shown in the figure) to temporarily store packets during routing operations. Sub-switches 201-204 are also interconnected by a bidirectional reservation bus 206 such that the switch controllers 207-210 can exchange reservation requests, ACKs and NAKs.

A first packet 217 is received via external input port 1.3 of sub-switch1 201. The switch controller1 207 reads the header of the first packet 217 to know its destination, for example by reading its destination address. Based on this destination address, the switch controller1 207, that for example may store or have access to the structure and topology of the external network (not shown in this figure) to which the switching device 200 is connected, determines that the first packet 217 is to egress the switching device 200 through the external output port 4.3 in its path towards its destination. The external output port 4.3 is connected to the sub-switch4 204 of the fully interconnected all-to-all network 205.

Then, the switch controller1 207 sends, via the reservation bus 206, a first reservation request to sub-switch4 204 with the amount of space the packet needs to be stored. For example, the first packet 217 may be a packet of 512 bytes and the first reservation request may be for 512 bytes. In some other examples, all received packets may have the same size, e.g. 256 bytes, and the first reservation request may be for an individual packet (e.g., one slot) or for more a block of packets (e.g., multiple slots). In such example, when there are at least 512 bytes available in the queue 211x of the external output port 4.3, the switch controller4 210 reserves a first space 219 in the queue of 512 bytes. Then, switch controller4 210 sends a first ACK to the switch controller1 207 via the reservation bus 206. Upon receipt of the first ACK, switch controller1 207 calculates all the possible candidate routes between sub-switch1 201 and sub-switch4 204 and determines that the optimal route is the minimal route between sub-switch1 201 and sub-switch4 204. As used herein, the minimal route may refer to the route having a minimal number of hops or the route that directly interconnects the sender sub-switch to the receiver sub-switch. For example, each switch controller 207-210 may store the inner structure and topology of the internal sub-network 205 of the switching device 200. In such example, the selected minimal route uses the inter-sub-switch link 216x for transmitting the packet 217.

Then, the switch controller1 207 routes the first packet 217 through internal output port 215a and internal input port 214d' and via the inter-sub-switch link 216a towards the external output port 4.3 of sub-switch4 204. When the first packet 217 arrives to the queue 211x, it is stored in the first reserved space 219 until it is processed and forwarded towards its destination by the switch controller4 210. Once the first packet 217 has been forwarded, the first reserved space 219 is freed.

Simultaneously or sequentially, a second packet 218 is received via external input port 2.2 of sub-switch2 202. The switch controller2 208 reads the header of the second packet 218 to know its destination, for example by reading its destination address. Based on this destination address, the switch controller2 208 that for example may also store or have access to the structure and topology of the external network, determines that the second packet 218 is also to egress the switching device 200 through the external output port 4.3 in its path towards its destination.

Then, the switch controller2 208 sends a second reservation request to sub-switch4 204 with the amount of space the packet needs to be stored, via the reservation bus 206. For example, the second packet 218 may be a packet of 256 bytes and the second reservation request may be for 256 bytes. Thus, once the requested 256 bytes are available in the queue 211x, the switch controller4 210 reserves a second space 220 of 256 bytes. Then, switch controller4 210 sends a second ACK to the switch controller2 208 via the reservation bus 206. Upon receipt of the second ACK, switch controller2 208 calculates all the possible candidate routes between sub-switch2 202 and sub-switch4 204 and determines that the optimal route for transmitting the second packet 218 is one of the non-minimal routes. As used herein, the non-minimal route may refer to routes that interconnects the sender sub-switch to the receiver sub-switch passing through at least one intermediate sub-switch. Then, the switch controller2 208 routes the second packet 218 via inter-sub-switch links 216b and 216c and using internal output ports 215b and 215c and internal input ports 214c and 214d'''.

When the second packet 218 arrives to the queue 211x, it is stored in the second reserved space 220 until it is processed and forwarded towards its destination by the switch controller4 210. Once the second packet 218 has been forwarded, the second reserved space 220 is freed and remains available for a new reservation.

The way and the order in which packets 217 and 218 are processed by the switch controller4 204 will depend on the moment in which they arrive to the queue 211x, the queue type, etc. The packets received at the switching device are independently processed to each other by the corresponding switch controllers.

In such example, each queue 211 may track how much space has been taken, both physically and reserved. For example, the queues 211 may implement credit-based flow control algorithm to control their available space. The queues 211 associated to each external output port 1.1-3, 2.1-3, 3.1-3, 4.1-3 may have credit counters to track the already taken and the available space in the queues 211.

Other control algorithms may be implemented in the switching devices, such as ACK/NAK protocols, etc., to manage the space in the queues 211.

Figure 3A:
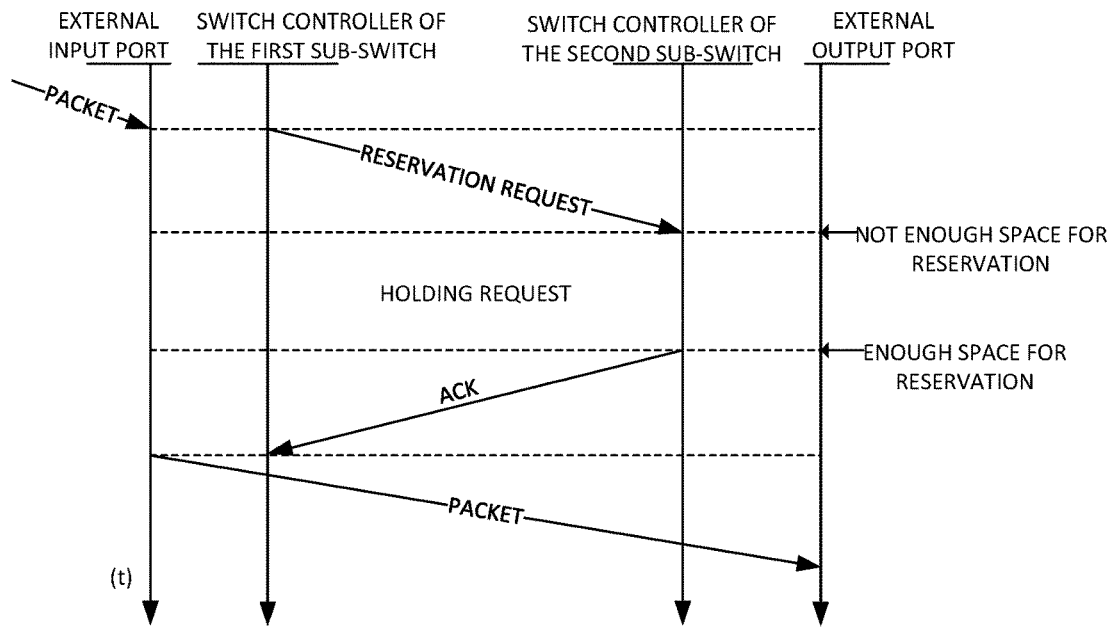
FIG. 3A is an example sequence diagram showing the communication sequence between the first sub-switch (sender) and the second sub-switch (receiver) with the second sub-switch holding a reservation request received from the first sub-switch.

FIG. 3A is an example sequence diagram showing the communication sequence between the first sub-switch (sender) and the second sub-switch (receiver) with the second sub-switch holding a reservation request received from the first sub-switch.

When a packet is received at one of the external input ports of a first sub-switch, the switch controller of said sub-switch determines the particular external output port though which the packet is to be routed towards its destination and sends a reservation request to the switch controller of the second sub-switch that is connected to the particular external output port via a reservation bus. This reservation request includes the amount of space the packet needs to be stored in the queue associated to the particular external output port.

Upon receipt of the reservation request, the switch controller of the second sub-switch checks whether there is enough space available in the queue to store the packet. When there is not enough space available in the queue, the switch controller of the second sub-switch holds the reservation request until enough space in the queue for the reservation is available, for example some space could be freed after some data already stored in the queue is processed and forwarded by the switch controller of the second sub-switch. When the amount of space available in the queue is enough to store the packet, the reservation request can be acknowledged. Thus, the switch controller of the second sub-switch blocks the requested space in the queue and send an ACK to the switch controller of the first sub-switch via the reservation bus.

Upon receipt of the ACK, the switch controller of the first sub-switch determines an optimal route within the internal sub-network to route the packet to the second sub-switch and sends the packet to the particular external output port of the second sub-switch using the optimal route. When the packet is received at the particular external output port, it is stored in the reserved space until it is processed and forwarded, by the switch controller of the second sub-switch, to its destination.

Figure 3B:
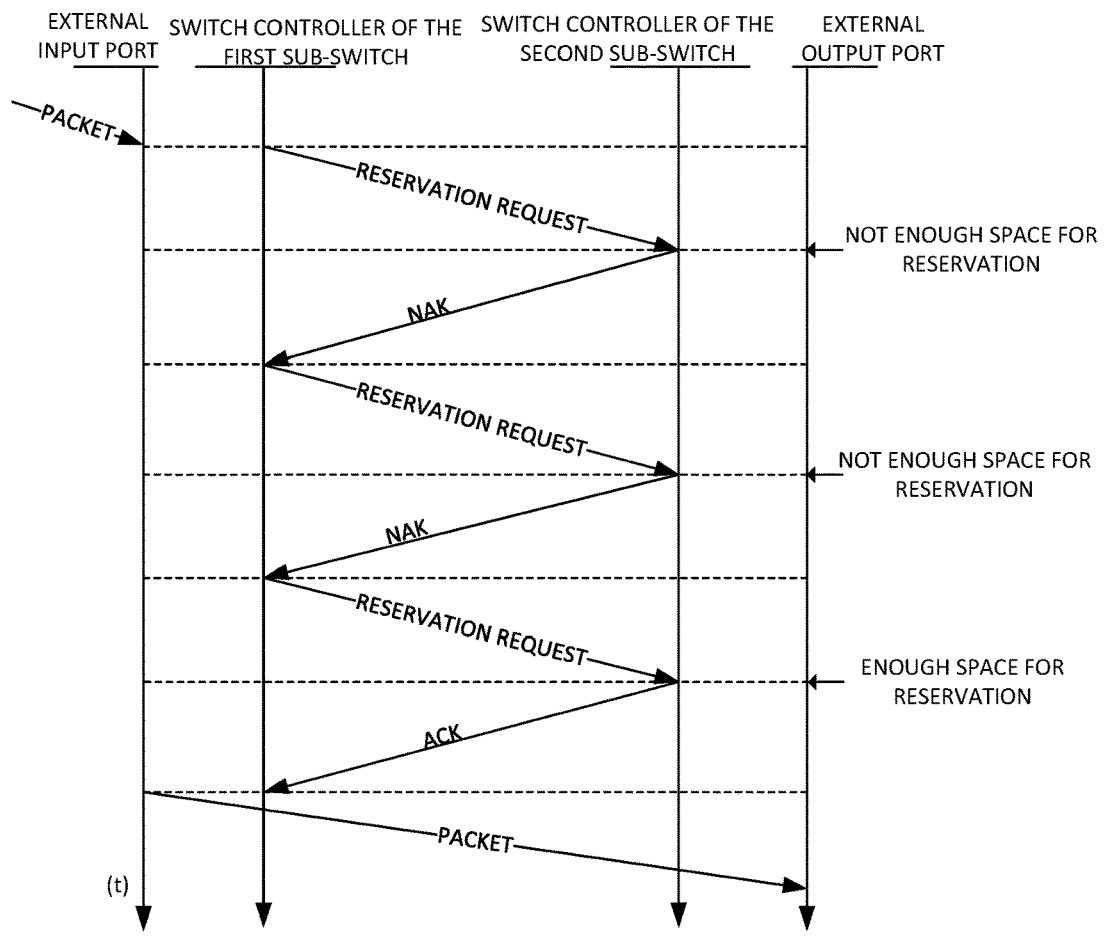
FIG. 3B is an example sequence diagram showing the communication sequence between the first sub-switch (sender) and the second sub-switch (receiver) with the first sub-switch retransmitting the reservation request to the second sub-switch.

FIG. 3B is an example sequence diagram showing the communication sequence between the first sub-switch (sender) and the second sub-switch (receiver) with the first sub-switch retransmitting the reservation request to the second sub-switch.

When a packet is received at one of the external input ports of a first sub-switch, the switch controller of said sub-switch determines the particular external output port though which the packet is to be routed and sends the corresponding reservation request to the respective switch controller of the second sub-switch.

Upon receipt of the reservation request, the switch controller of the second sub-switch checks whether there is enough space available in the queue to store the packet. When there is not enough space available in the queue, the switch controller of the second sub-switch automatically rejects the reservation and sends a NAK to the switch controller of the first sub-switch via the reservation bus. In response to receipt of the NAK, the switch controller of the first sub-switch retransmits the reservation request to the switch controller of the second sub-switch, as many times as necessary, until there is enough space available in the queue for the reservation. When the amount of space available in the queue is enough to store the packet, the reservation request can be acknowledged. Thus, the switch controller of the second sub-switch blocks the requested space in the queue and send an ACK to the switch controller of the first sub-switch via the reservation bus.

Upon receipt of the ACK, the switch controller of the first sub-switch determines an optimal route within the internal sub-network to route the packet to the second sub-switch and sends the packet to the particular external output port of the second sub-switch using the optimal route. When the packet is received at the particular external output port, it is stored in the reserved space until it is processed and forwarded, by the switch controller of the second sub-switch, to its destination.

In some other examples, when a reservation request is received at the second sub-switch and there is not enough space available in the queue to store the corresponding packet, the switch controller of the second sub-switch may hold the reservation request for a pre-defined period of time. If after expiration of the pre-defined period of time, there is still not enough space in the queue for the packet, the switch controller of the second sub-switch may reject the reservation and send a NAK to the switch controller of the first sub-switch via the reservation bus. Otherwise, if during the pre-defined period of time enough space for the packet is available in the queue for the packet, the switch controller of the second sub-switch may block the requested space and send an ACK to the switch controller of the first sub-switch.

Figure 4:
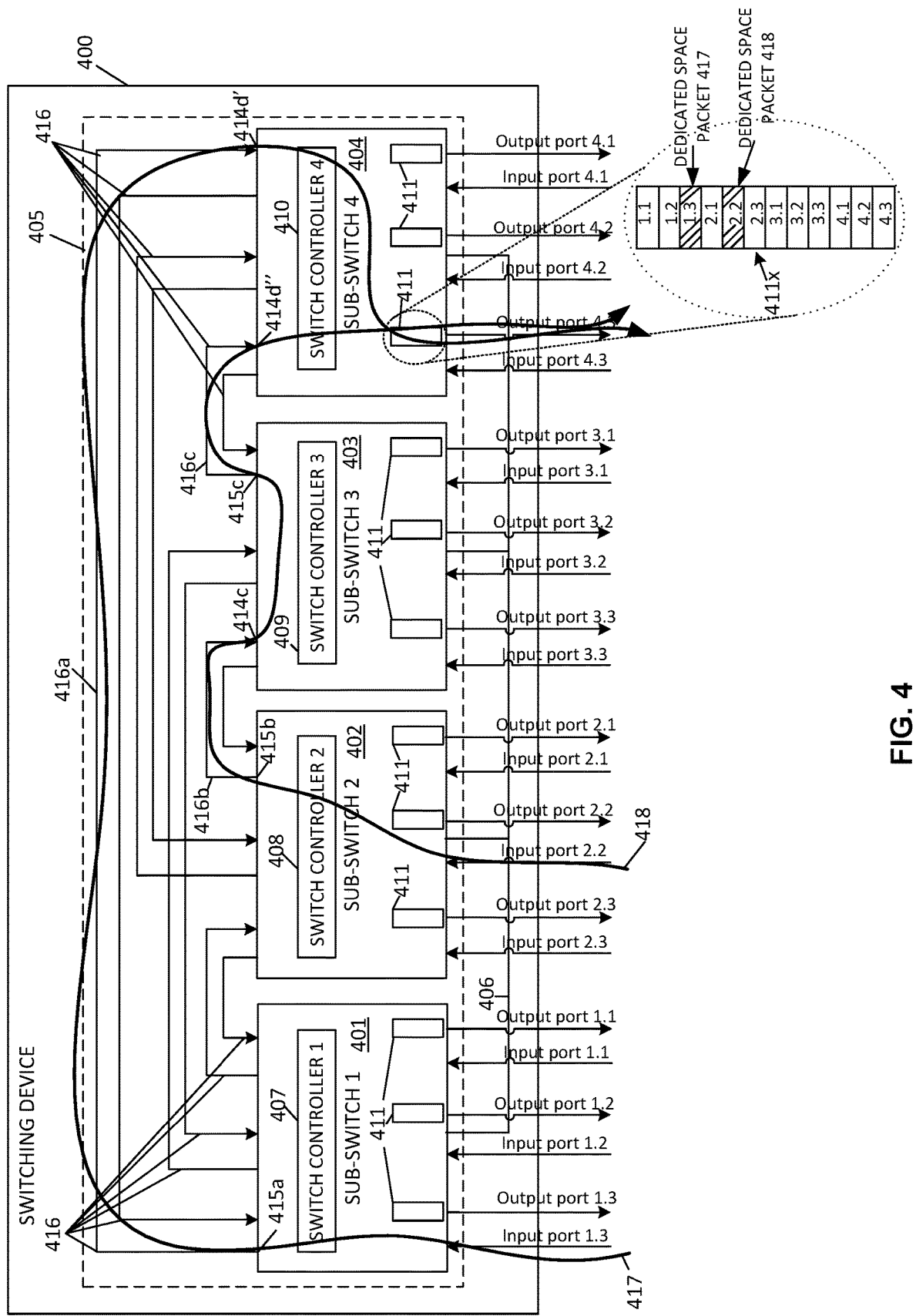
FIG. 4 is a block diagram of the example reservation-based switching device of FIG. 2, having dedicated spaces in the queues for the external input ports.

FIG. 4 is a block diagram of the example reservation-based switching device of FIG. 2, having dedicated space for the external input ports in the queues associated to the external output ports. It should be understood that the example switching device 400 may include additional components and that some of the components described herein may be removed and/or modified without departing from a scope of the example switching device 400. Additionally, implementation of example switching device 400 is not limited to such example as shown in FIG. 4.

In such example, each sub-switch 401-404 has a respective switch controller 407-410 for routing packets through its internal fully interconnected all-to-all network 405. The external output ports 1.1-3, 2.1-3, 3.1-3, 4.1-3 have associated a respective queue 411 to store packets until they are processed and forwarded to its destination. In addition, each of the queues 411 has a dedicated space corresponding to each external input port 1.1-3, 2.1-3, 3.1-3, 4.1-3 of the switching device 400. In particular, queue 211x has twelve dedicated spaces 1.1-3, 2.1-3, 3.1-3 and 4.1-3 corresponding to the respective external input ports 1.1-3, 2.1-3, 3.1-3, 4.1-3. These dedicated spaces are pre-defined amounts of space within the queue 211x assigned for each one of the plurality of external input ports 1.1-3, 2.1-3, 3.1-3, 4.1-3. These dedicated spaces are to only store packets from the external input ports to which the dedicated spaces are assigned. In some examples, all dedicated spaces in a queue may have the same amount of space while in some other examples these amounts may differ from each other.

A first packet 417 is received via external input port 1.3 of sub-switch1 401. The switch controller1 407 reads the header of the first packet 417 and determines that the first packet 417 is to egress the switching device 400 through the external output port 4.3. This first packet 417 is to occupy the dedicated space 1.3 of the queue 411x associated to the external output port 4.3. The switch controller1 407, prior to reserving the space for the first packet 407, checks whether there is enough space available for the packet in the dedicated space 1.3. If there is not enough space in the dedicated space 1.3 for the first packet 417, this first packet 417 is stored in a queue (not shown in this figure) associated to the external input port 1.3 until enough space is available in the dedicated space 1.3. When there is enough space available in the dedicated space 1.3, the switch controller4 410 blocks the required space for the first packet 417. Then, the switch controller4 410 sends a first ACK to the switch controller1 407 via the reservation bus 406. Upon receipt of the first ACK, switch controller1 407 calculates all the possible candidate routes between sub-switch1 401 and sub-switch4 404 and determines that the optimal route is the minimal route between sub-switch1 401 and sub-switch4 404.

Then, the switch controller1 407 routes the first packet 417 towards the external output port 4.3. When the first packet 417 arrives to the queue 411x, it is stored in the dedicated space 1.3 until it is processed and forwarded towards its destination by the switch controller4 410. Once the first packet 217 has been forwarded, the dedicated space 1.3 is freed.

Simultaneously or sequentially, a second packet 418 is received via external input port 2.2 of sub-switch2 402. The switch controller2 408 reads the header of the second packet 418 and determines that the second packet 418 is also to egress the switching device 400 through the external output port 4.3. This second packet 418 is to occupy the dedicated space 2.2 of the queue 411x associated to the external output port 4.3. The switch controller2 408 also checks whether there is enough space available for the packet in the dedicated space 2.2 and when there is enough space available, the switch controller4 410 blocks the required space for the second packet 418. Then, the switch controller4 410 sends a second ACK to the switch controller2 408 via the reservation bus 406. Upon receipt of the second ACK, switch controller2 408 calculates all the possible candidate routes between sub-switch2 402 and sub-switch4 404 and determines that the optimal route is one of the non-minimal routes between sub-switch2 402 and sub-switch4 404. Then, the switch controller2 408 routes the second packet 418 via inter-sub-switch links 416b and 216c and using internal output ports 415b and 415c and internal input ports 414c and 414d"

When the second packet 418 arrives to the queue 411x, it is stored in the dedicated space 2.2 until it is processed and forwarded towards its destination by the switch controller4 410. Once the second packet 418 has been forwarded, the space occupied by the second packet 418 in the dedicated space is freed and remains available for a new reservation.

In such example, the queues (not shown) associated to the external input ports 1.1-3, 2.1-3, 3.1-3, 4.1-3 may track how much space has been taken, both physically and reserved. These queues may implement credit-based flow control algorithms to control their available space with credit counters to track the already taken and the available space in the queues 211 or may implement other control algorithms such as ACK/NAK protocols, etc., to manage the space in the queues.

In some examples, the switch controller4 410 may further send a notification via the reservation bus 406 to the sub-switch1 401 or the sub-switch2 402 when the first packet 417 or the second packet 418 leave their respective dedicated spaces. These notifications may comprise information about the external output port to which is associated the queue from which the packet has left and an indication of the amount of space available in that dedicated space. The amount of space available in that dedicated space may correspond to portions of a packet or multiple packets. For example, these notifications may comprise credits representing bytes, flits, packets, etc.

Figure 5:
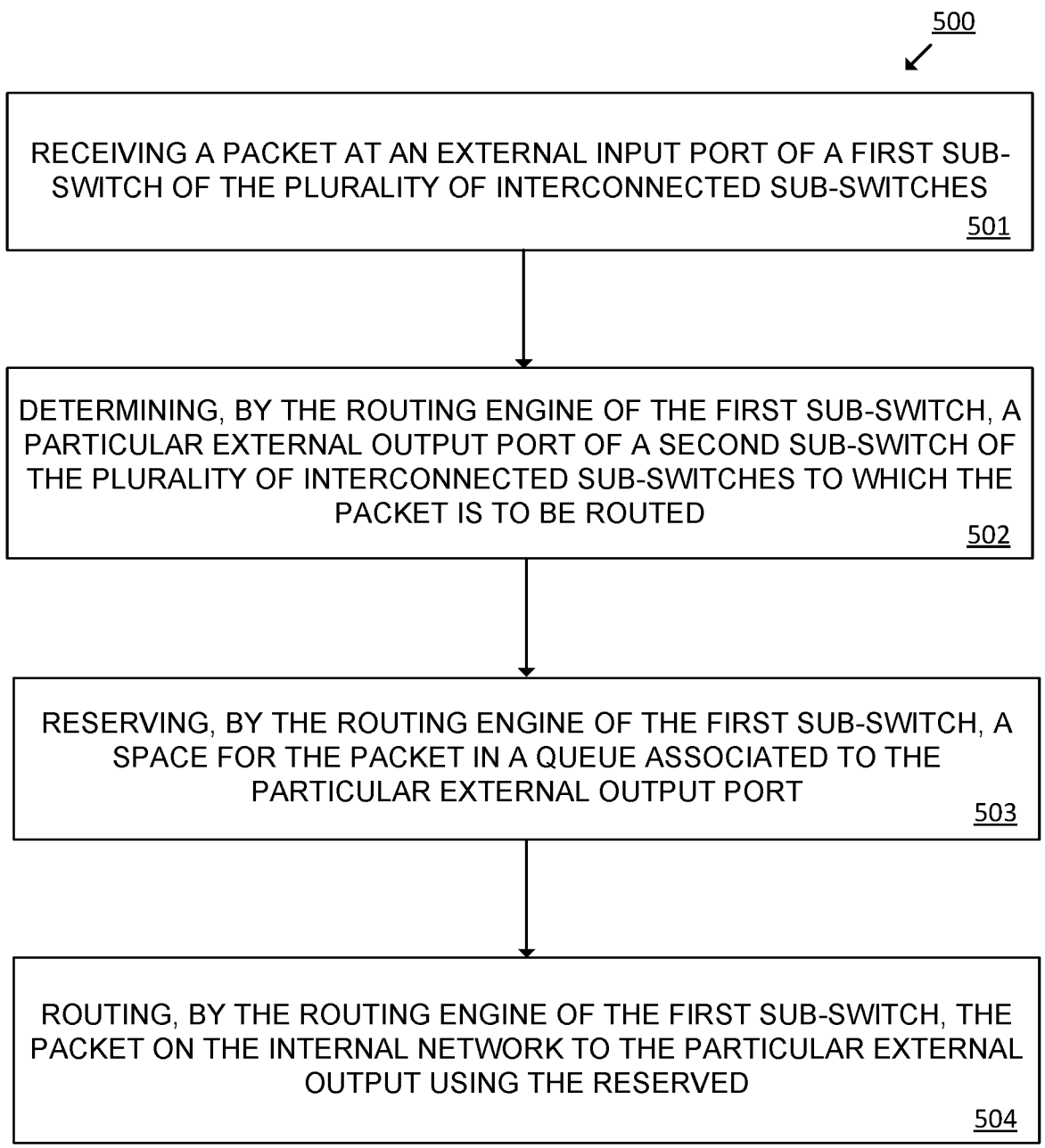
FIG. 5 is a flowchart of an example method for routing packets using reservation-based switching devices with a plurality of interconnected sub-switches forming the internal network of the reservation-based switching devices.

FIG. 5 is a flowchart of an example method for routing packets using reservation-based switching devices with a plurality of interconnected sub-switches forming its internal sub-network. Each sub-switch of the plurality of sub-switches comprises a switch controller for managing and routing the received packets through the internal sub-network.

At step 501 of the method 500, a packet is received at one of the external input ports of a first sub-switch of the plurality of interconnected sub-switches. These external input ports are to receive data packets from other devices external to the switching device.

At step 502 of the method 500, the switch controller of the first sub-switch determines the particular external output port of a second sub-switch of the plurality of interconnected sub-switches to which the packet is to be routed. This external output port may interconnect the current switching device with another switching device or any other device within the same network in which the current switching device is connected or to any network external to the current switching device.

At step 503 of the method 500, the switch controller of the first sub-switch reserves a space for the packet in a queue associated to the particular external output port. In some examples, the switch controller of the first sub-switch sends a reservation request to the second sub-switch for the packet. The reservation request is for reserving an amount of space for the packet in the queue associated to the particular external output port.

At step 504 of the method 500, the switch controller of the first sub-switch routes the packet on the internal sub-network to the particular external output using the reserved space in the queue. By reserving space at the destination external output ports for the packets before routing the packets through the intermediate queues in the internal sub-networks of the switching devices, a lack of output credits in the corresponding intermediate queues is avoided. This will avoid dependencies between packets routed through a same sub-network because they are all guaranteed to be able to get to their corresponding queues of their destination external output ports before becoming blocked.

In some examples, the switch controller may determine an optimal route within the internal sub-network for the packet by, for example, using a pre-existing routing table stored in the switch controller that stores the inner topology of the reservation-based switching device or by performing arithmetic operations, for example using fixed function logic in the switching device. The switch controller may also store, in the same or a different table, the topology of the external network to which the switching device is connected so the switch controllers are able to identify the external output port a packet is to take in order to be routed to its destination. Alternatively, all the sub-switches may have access to a table stored in the switching device storing the topology of the external network. These routing tables may be periodically updated by a network controller communicatively connected to the switching device.

In some examples, upon reception of the reservation request in the second sub-switch, the switch controller of the second sub-switch checks whether there is enough space available in the queue for the reservation and, when there is enough space available in the queue for the reservation, reserves the requested amount of space for the packet and sends an ACK to the switch controller of the first sub-switch.

In some other examples, when there is not enough space available in the queue for the reservation, the switch controller of the second sub-switch holds the reservation request until there is enough space available in the queue for the reservation request. Alternatively, when there is not enough space available in the queue for the reservation, the switch controller of the second sub-switch rejects the reservation request and sends a NAK to the switch controller of the first sub-switch. In such example, in response to reception of the NAK the switch controller of the first sub-switch re-sends (retransmits) the reservation request to the second sub-switch In some other examples, the switch controller of the second sub-switch, after checking whether there is enough space available in the queue for the reservation request, may determine that there is enough space available in the queue for partially attending the reservation request, but not totally. Then, the switch controller of the second sub-switch may send an ACK to the switch controller of the first sub-switch for a subset of the requested space, wherein the subset of the requested space corresponds to at least a part of a space available in the queue. For example, if the queues associated to the external output ports are divided in packets slots and the received reservation request is for 10 packets slots, the switch controller of the second sub-switch may determine that there are only 5 slots available in the queue of the destination external output port. In such example, the switch controller of the second sub-switch may send an ACK for a subset of 5 packet slots to the switch controller of the first sub-switch via the reservation bus.

In response to receipt of the ACK for the subset of the requested space, the switch controller of the first sub-switch sends a part of the packet corresponding to the space available in the queue. In such example, the switch controller of the first sub-switch divides the packet into data blocks and sends a part of the packet corresponding to the five available packet slots. More specifically, the switch controller of the first sub-switch may send five data blocks wherein each block has the size of a packet slot. The switch controller of the first sub-switch keeps the rest of the packet until it receives more ACKs from the switch controller of the second sub-switch for the other five requested packet slots.

Figure 6:
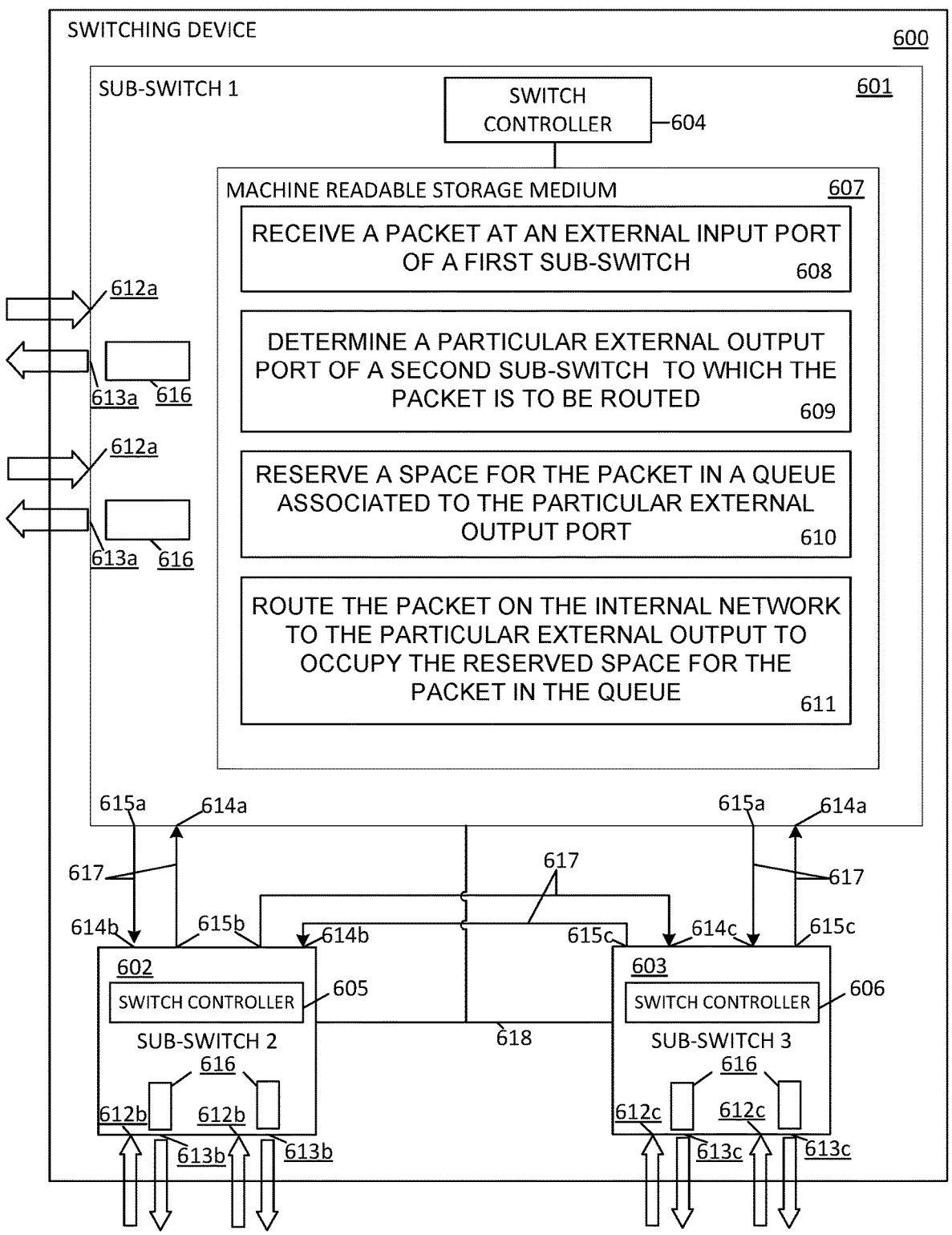
FIG. 6 is a block diagram of an example reservation-based switching device with a plurality of interconnected sub-switches forming the internal network of the reservation-based switching device and including a machine-readable storage medium that stores instructions to be executed by the switch controllers of the reservation-based switching device.

FIG. 6 is a block diagram of an example reservation-based switching device 600 with three interconnected sub-switches 601-603 forming a 2D mesh network and including a machine-readable storage medium 607 that stores instructions 608-611 to be executed by the switch controllers 604-606 of the reservation-based switching device 600. While in FIG. 6 only sub-switch1 601 shows the machine-readable storage medium 607 storing instructions 608-611, the other two sub-switches 602, 603 also stores a corresponding machine-readable storage medium 607 storing instructions 608-611. It should be understood that the reservation-based switching device 600 depicted in FIG. 6 may include additional components and that some of the components described herein may be removed and/or modified without departing from a scope of the example reservation-based switching device 600. Additionally, implementation of reservation-based switching device 600 is not limited to such example.

The reservation-based switching device 600 is depicted as including six external input ports 612*a*, 612*b*, 612*c*, through which data packets are received, and six external output ports 613*a*, 613*b*, 613*c*, through which packets are forwarded to a next hop towards their destination in a network (not shown in this figure) to which the reservation-based switching device 600 is connected. The switch controllers 604-606 may include hardware and software logic to execute instructions, such as the instructions 608-611 stored in the machine-readable storage medium 607. Each sub-switch 601-603 comprises two internal input port 614*a*, 614*b* and 614*c*, respectively, through which packets are received from others sub-switches 601-603, and two internal output port 615*a*, 615*b* and 615*c*, respectively, through which packets are sent to others sub-switches 601-603. In addition, each sub-switch 601-603 may have a routing table storing all the possible routes within the 2D mesh network. In some other examples, the reservation-based switching device 600 implements the routing table storing all the possible routes within the 2D mesh network that is accessible for all the sub-switches 601-603. This routing table may also store all the possible routes between the switching device 600 and the rest of network devices in the network.

The external output ports 613 have a corresponding queue 616 to store data packets until they are processed and forwarded to its destination by the respective switch controllers 604-606. These queues can be any kind of queues such as FIFO queues, circular queues, priority queues, etc. The three sub-switches 607-609 are connected to each other via inter-sub-switch links 617 to route packets internally and via a reservation bus 618 to exchange reservation requests, ACKs and NAKs.

One of the external input ports 612 of a first sub-switch 601-603, for example one of the external input ports 612*a* of the sub-switch1 601, receives at 608 a packet. In response to reception of the packet, the switch controller 604 determines at 609 the external output port of a second sub-switch, for example one of the external output ports 613*c* of sub-switch3 603, to which the packet is to be routed. The switch controller 604 reserves at 610 a space for the packet in the queue 616 associated to the external output ports 613*c*. Then, in response to reception of an ACK for the reservation from the switch controller 606, the switch controller 604 routes the packet on the internal sub-network to the particular external output port 613*c* to occupy the reserved space for the packet in the queue 616.

In some examples, the machine-readable storage medium 607 comprises instructions to, upon reception of the reservation request in the second sub-switch, cause the switch controller of the second sub-switch to check whether there is enough space available in the queue for the reservation and, when there is enough space available in the queue for the reservation, to reserve the amount of space for the packet and send an ACK to the switch controller of the first sub-switch.

The switch controllers 604-606 may include hardware and software logic to perform the functionalities described above in relation to instructions 608-611. The machine-readable storage medium 607 may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The invention claimed is:

1. A switching device comprising:
   a first sub-switch having an external input port;
   a first switch controller associated with and coupled to the first sub-switch;
   a second sub-switch having an external output port and an output queue corresponding to the external output port; and
   a second switch controller associated with and coupled to the second sub-switch;
   wherein the first switch controller is coupled with the second switch controller via a reservation bus;
   wherein the first sub-switch and second sub-switch are coupled via a data link that is different from the reservation bus; and
   wherein, upon receiving a packet at the external input port on the first sub-switch, the first switch controller is configured to send, via the reservation bus to the second switch controller, a request to reserve a space in the output queue prior to allowing the first sub-switch to transmit the packet to the second sub-switch via an internal network of the switching device.

2. The switching device of claim 1, wherein, upon reception of the reservation request in the second sub-switch, the second switch controller is to check whether there is enough space available in the output queue associated with the external output port for the reservation request and when there is enough space available in the output queue for the reservation request, the switch controller is to:
   reserve the amount of space corresponding to at least the size of the packet in the output queue associated to the external output port; and
   send an acknowledgement to the first sub-switch.

3. The switching device of claim 2, wherein, when there is not enough space available in the output queue for the reservation request, the second switch controller is to:
   hold the reservation request until there is enough space available in the output queue for the reservation; or
   reject the reservation request and send a negative-acknowledgement to the first sub-switch; or
   hold the reservation request for a pre-defined period of time and reject the reservation request upon expiration of the pre-defined period of time and send a negative-acknowledgement to the first sub-switch.

4. The switching device of claim 3, wherein, in response to reception of the negative-acknowledgement in the first sub-switch, the first switch controller is to re-transmit the reservation request to the second sub-switch.

5. The switching device of claim 2, wherein, when there is not enough space available in the output queue for totally attending the reservation request, the second switch controller is to send an acknowledgement to the first sub-switch for a subset of the requested space, the subset of the requested space corresponding to the space available in the queue.

6. The switching device of claim 5, wherein, in response to reception of the acknowledgement for the subset of the requested space in the first sub-switch, the first switch controller is to send a portion of the packet corresponding to the space available in the output queue.

7. The switching device of claim 1, wherein the output queue associated to the external output port has a dedicated space for each external input port of the switching device and the space reserved for the packet is within the dedicated space in the output queue for the external input port through which the packet has been received.

8. The switching device of claim 7, wherein, prior to reserving the space for the packet, the first sub-switch is to check whether there is enough space available for the packet in the dedicated space for the external input port.

9. The switching device of claim 8, wherein, when there is not enough space available in the dedicated space for the external input port, the first sub-switch is to hold the packet in a queue associated with the external input port until there is enough space available in the dedicated space for the packet.

10. The switching device of claim 7, wherein the second switch controller is to send a notification to the first sub-switch when a packet leaves the output queue.

11. The switching device of claim 1, wherein the internal network is a deadlock free network.

12. A method of switching packets in a switching device, the switching device comprising a plurality of interconnected sub-switches forming an internal network of the switching device and each sub-switch comprising a switch controller, comprising:
    receiving a packet at a particular external input port of a first sub-switch of the plurality of interconnected sub-switches, wherein the first sub-switch is associated with and coupled to a first switch controller;
    determining, by the first switch controller, a particular external output port of a second sub-switch of the plurality of interconnected sub-switches to which the packet is to be routed, wherein the second sub-switch is associated with and coupled to a second switch controller, wherein the second sub-switch has an output queue corresponding to the particular external output port, wherein the first switch controller is coupled with the second switch controller via a reservation bus, and wherein the first sub-switch and second sub-switch are coupled via a data link that is different from the reservation bus;
    sending, by the first switch controller of the first sub-switch via the reservation bus to the second switch controller, a request to reserve a space for the packet in the output queue corresponding to the particular external output port; and
    routing, by the first switch controller of the first sub-switch, the packet to the particular external output to occupy the reserved space for the packet in the output queue.

13. The method of claim 12, wherein upon reception of the reservation request, the second switch controller of the second sub-switch:
    checks whether there is enough space available in the output queue associated to the particular output port for the reservation request and when there is enough space available in the output queue for the reservation request;
    reserves the amount of space corresponding to at least the size of the packet in the output queue associated to the particular output port; and
    sends an acknowledgement to the first sub-switch.

14. The method of claim 13, wherein, when there is not enough space available in the output queue for the reservation request, the second sub-switch:
    holds the reservation request until there is enough space available in the output queue for the reservation; or
    rejects the reservation request and send a negative-acknowledgement to the first sub-switch; or
    holds the reservation request for a pre-defined period of time and reject the reservation request upon expiration of the pre-defined period of time and send a negative-acknowledgement to the first sub-switch.

15. The method of claim 14, wherein further comprising:
in response to reception of the negative-acknowledgement in the first sub-switch, re-transmitting, by the first switch controller, the reservation request to the second sub-switch.

16. The method of claim 12, comprising assigning, for each one of the external input ports of the switching device, a dedicated space in each one of the queues associated to the external input ports of the switching device, wherein the space reserved for the packet is the dedicated space for the particular external input port.

17. The method of claim 16, wherein, prior to reserving the space for the packet, the first sub-switch checks whether there is enough space available for the packet in the dedicated space of the queue for the particular external input port through which the packet has been received.

18. A non-transitory machine readable storage medium having stored thereon machine readable instructions to cause a computer processor of a first switch controller of a first sub-switch of a plurality of interconnected sub-switches, to:
in response to reception of a packet at an external input port of the first sub-switch, determine a particular external output port of a second sub-switch of the plurality of interconnected sub-switches to which the packet is to be routed, the plurality of interconnected sub-switches forming an internal network of the switching device, wherein the second sub-switch is associated with and coupled to a second switch controller, wherein the second sub-switch has an output queue corresponding to the particular external output port, wherein the first switch controller is coupled with the second switch controller via a reservation bus, and wherein the first sub-switch and second sub-switch are coupled via a data link that is different from the reservation bus;

sending, by the first switch controller of the first sub-switch via the reservation bus to the second switch controller, a request to reserve a space for the packet in the output queue associated to the particular external output port; and in response to reception of an acknowledgement for the reservation from the second sub-switch, route the packet on the internal network to the particular external output to occupy the reserved space for the packet in the output queue.

* * * * *